United States Patent [19]

Wood, III

[11] Patent Number: 5,739,607
[45] Date of Patent: Apr. 14, 1998

[54] HYBRID SPINDLE BEARING

[75] Inventor: David B. Wood, III, Maineville, Ohio

[73] Assignee: Cincinnati Milacron Inc., Cincinnati, Ohio

[21] Appl. No.: 707,021

[22] Filed: Sep. 11, 1996

Related U.S. Application Data

[63] Continuation of Ser. No. 205,456, Mar. 4, 1994, abandoned.

[51] Int. Cl.$^6$ ............................... H02K 7/08; H02K 7/09
[52] U.S. Cl. ........................ 310/90.5; 310/90; 384/227; 384/228; 409/231; 409/233; 409/234; 408/8
[58] Field of Search ........................ 310/90.5; 384/227, 384/228, 240, 243, 603; 408/8, 11, 13; 409/231, 233, 234

[56] References Cited

U.S. PATENT DOCUMENTS

| | | | |
|---|---|---|---|
| 3,222,991 | 12/1965 | Bone | 90/11 |
| 3,307,890 | 3/1967 | Johansson | 308/189 |
| 3,313,581 | 4/1967 | Kusakabe | 308/189 |
| 3,329,066 | 7/1967 | Wood | 90/11 |
| 3,352,611 | 11/1967 | Seidel | 308/187 |
| 3,372,951 | 3/1968 | McCash | 287/91 |
| 3,664,718 | 5/1972 | Uhtenwoldt | 308/189 |
| 3,804,477 | 4/1974 | Allmandinger et al. | 308/207 |
| 3,934,950 | 1/1976 | Kuhlmann | 308/10 |
| 3,945,694 | 3/1976 | Vailette | 308/184 A |
| 4,180,946 | 1/1980 | Heijkenskjold et al. | 51/134.5 |
| 4,211,454 | 7/1980 | Mitchell et al. | 308/26 |
| 4,226,485 | 10/1980 | Pruvot | 308/207 R |
| 4,400,098 | 8/1983 | Lacey et al. | 384/99 |
| 4,502,832 | 3/1985 | Becker | 415/10 |
| 4,514,123 | 4/1985 | Johnstone et al. | 409/231 |
| 4,551,032 | 11/1985 | Mottershead | 384/517 |
| 4,577,981 | 3/1986 | Kimura | 384/495 |
| 4,611,934 | 9/1986 | Piotrowski et al. | 384/517 |
| 4,641,978 | 2/1987 | Kapich | 384/102 |
| 4,942,321 | 7/1990 | Kanemitsu | 310/90.5 |
| 4,956,945 | 9/1990 | Ooshima | 51/165.93 |
| 4,976,177 | 12/1990 | Fouche | 82/147 |
| 5,013,987 | 5/1991 | Wakui | 318/632 |
| 5,027,280 | 6/1991 | Ando et al. | 364/474.16 |
| 5,107,192 | 4/1992 | Kirchberg, Jr. et al. | 318/540 |
| 5,119,254 | 6/1992 | Brown et al. | 360/106 |
| 5,133,158 | 7/1992 | Kihara et al. | 51/165.77 |
| 5,142,175 | 8/1992 | Watanabe | 310/90.5 |
| 5,193,953 | 3/1993 | Jesinger | 310/90.5 |
| 5,197,270 | 3/1993 | Stahlecker | 57/58.83 |
| 5,205,078 | 4/1993 | Takara et al. | 51/167.77 |
| 5,251,085 | 10/1993 | Morris et al. | 360/106 |
| 5,262,692 | 11/1993 | Williams et al. | 310/90.5 |
| 5,469,007 | 11/1995 | Toyama | 310/90.5 |

OTHER PUBLICATIONS

Harris, T.A., "Rolling Bearing Analysis", Copr. 1966, pp. 247–249, John Wiley & Sons, Inc. New York, NY, USA.
Article from *Precision Toolmaker*, Jun. 1991, p. 189 entitled "Now High Frequency Spindles Get Higher Speeds and Power".
Article from U.K. magazine *Machinery and Production Engineering*, 7 Feb. 1992, entitled "Cycles Reduce as Spindle Speeds Rise"; pp. 46–52, inclusive.

*Primary Examiner*—Thomas M. Dougherty
*Assistant Examiner*—K. I. E. Tamai
*Attorney, Agent, or Firm*—Thomas M. Farrell

[57] ABSTRACT

A machine tool spindle is supported at its spindle nose in a front, rolling element mechanical anti-friction thrust and radial support bearing means. The middle and rear end of the spindle is supported in a magnetic radial rear bearing and further supported at a generally mid-position of the spindle by magnetic radial mid bearing. The two magnetic radial bearings provide radial suspension of the spindle and permit the spindle to slide freely. A spindle flange is axially forced by a magnetic axial thrust bearing to vary the pre-load of the mechanical anti-friction thrust and radial support bearing.

21 Claims, 3 Drawing Sheets

HYBRID SPINDLE BEARING

This application is a continuation of application Ser. No. 08/205456, filed 4 Mar., 1994, now abandoned.

FIELD OF INVENTION

In general, this invention relates to anti-friction bearings for supporting a spindle with respect to a housing. In particular, the invention relates to devices for variably pre-loading rotary anti-friction bearings.

BACKGROUND OF THE INVENTION

In the anti-friction bearing arts, the usual practice is to apply bearings in pairs and to axially pre-load the inner and outer races of the pair against one another to remove the shake, or clearances, and to induce a desired amount of strain into related machine elements, for example, a tool spindle, so that machining force levels will not overcome the pre-load and result in spindle movement. Also, a certain amount of strain is often put into the machine tool spindle so that thermal growth may be accommodated without loosening the bearing sets.

A high level of pre-load is useful for maintaining spindle stability during cutting operations, but it is also desirable that the pre-load amount be matched to the cutting forces seen by the spindle. For example, at high rotational spindle speeds, light cutting forces are generally encountered, while at low spindle speeds, heavy cutting forces are generally seen. Since the pre-load amount directly influences the torque on a bearing set, it can be seen that unnecessarily large pre-load forces cause high torques which, in the case of high rotational speeds, consume a large quantity of horsepower. Such high horsepower running conditions cause excessive heat build-up and contribute to early failure of the bearings.

Most bearing pre-load devices act in a similar fashion: front (nearest the spindle nose) and rear spaced-apart anti-friction bearings are mounted with their inner races secured to the spindle while the outer race of the front bearing is positioned against solid housing shoulder. The corresponding outer race of the rear bearing is loaded by mechanical or fluid springs, reacting against the housing, to induce a strain in the spindle through the anti-friction elements. In this common application, the rear bearing outer race must be slidable in its bore, necessitating radial clearance which may contribute to vibration or loss of precision in the spindle mounting arrangement.

Several bearing pre-loading patents are of interest:

U.S. Pat. No. 4,611,934 illustrates a spindle bearing pre-load device having spaced anti-friction bearings, where the front set is carried against a housing wall and the rear set is movable and is carried within an axially deformable diaphragm. The flexible diaphragm provides the rear spindle bearing with means for moving axially without radial clearance or shake. The diaphragm may be dimensioned to provide an initial amount of pre-load when assembled, and higher levels of pre-load may be later introduced by means of a hydraulic piston acting on the diaphragm.

U.S. Pat. No. 3,352,611 illustrates a spindle bearing pre-load device where the rear set of spindle bearings are thrust rearwardly by mechanical springs loaded against an outer race carrier. The outer race carrier is mounted in a linear ball bushing, so that it may be easily moved in an axial direction. In this device, the maximum amount of pre-load is determined by the compressed springs, and the maximum pre-load force is overcome by an opposing member in a controlled manner, in response to spindle speeds; at high speeds, the pre-load on the bearings is reduced.

In certain high speed spindle applications, where rolling elements might tend to limit operation, it is known to provide magnetic bearings as the sole means for supporting a rotating spindle with respect to a housing. In U.S. Pat. No. 4,180,946, a spindle is carried within a housing on spaced-apart primary bearings, which are non-contacting bearings employing magnetic fields to support the spindle. Mechanical catch bearings are provided around the spindle at a predetermined clearance, so that, in the event of a magnetic bearing failure or excessive deflection of the spindle, back-up suspension is provided. The spaced radial spindle bearings are electromagnetic, and it is taught that precise displacements of the tool, of limited amplitude, may be controlled by modifying the signals to the respective bearings. The device also provides for axial control by means of an electromagnetic axial thrust bearing, where a spindle-carried disk is controlled between opposing coils on the housing. The magnetic device depicted in the patent illustrates a grinding wheel tool mounted to the outer end of the spindle. It should be noted that high speed cartridge-type spindles have been employed in the grinding arts for many years; cutting forces in these applications are generally low and do not require heavy bearing pre-loads, as might be required in a machining center for performing milling operations.

The present invention obviates many difficulties inherent in the prior art devices, by providing for a rugged spindle design which may be suitable for heavy duty milling operations at or near the spindle nose. In it, a set of mechanical anti-friction bearings are employed near the spindle nose, and the pre-load of the bearings may be adjusted periodically by magnetic means. The inventive device is a hybrid bearing system, where the spindle nose is solidly supported in mechanical anti-friction rolling element bearings, and the portion of the spindle remote from the applied load, and hence having a lower reaction load, is supported in a magnetic bearing means. The magnetic bearing means allows the remote portion of the spindle to move smoothly and without the degree of drag experienced in prior art sliding bearing assemblies. Pre-load of the anti-friction rolling element bearings is attained by a controlled electromagnetic thrust bearing.

SUMMARY OF THE INVENTION

It is, therefore, an object of the present invention to provide a spindle support system having a mechanical anti-friction thrust and radial bearing means near an outboard end of a spindle and an electromagnetic radial support bearing means at a spindle location remote from the outboard end.

Another object of the invention is to provide a variable pre-load mechanism for an anti-friction rolling element bearing applied to a spindle, where an axially movable portion of the spindle may be freely moved through one or more electromagnetic radial support bearings of an electromagnetic radial support bearing means.

A further object of the invention is to provide a variable pre-load mechanism for an anti-friction rolling element bearing applied to a spindle, where an axially movable portion of the spindle may be freely moved through electromagnetic radial support bearings, and where pre-load force is applied by means of an electromagnetic axial thrust bearing reacting against the spindle and a housing.

The invention is shown embodied in a spindle assembly having a housing, a spindle, and motor means for effecting relative rotation between the housing and the spindle, about the spindle axis, where a spindle support system comprises: a mechanical anti-friction thrust and radial first bearing means near an outboard end of the spindle for supporting the spindle and housing in a predetermined relationship during relative rotation, the first bearing means comprising anti-friction bearing elements, including pre-loadable rolling elements; a magnetic radial support second bearing means for supporting the spindle and housing in a predetermined relationship during relative rotation, the second bearing means having two spaced-apart magnetic bearing elements; and an axial pre-loading means for relatively moving the spindle and the housing along the spindle axis to vary the pre-load of the pre-loadable rolling elements. The preferred embodiment of the axial pre-loading means includes an electromagnetic axial thrust bearing means for generating an electromagnetic force between the spindle and the housing and a means for selectively controlling the electromagnetic force.

DESCRIPTION OF THE INVENTION

Figure 1:
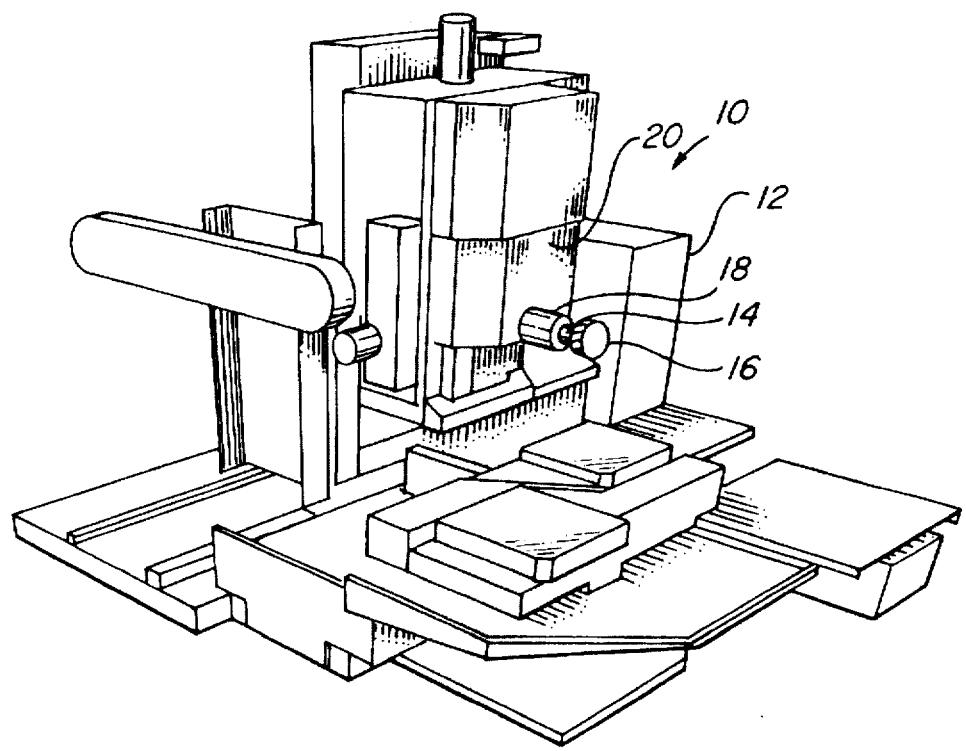
FIG. 1 is a perspective view of a machining center employing a housing and a rotatable spindle.

FIG. 1 of the drawings illustrates a machining center 10 of the type manufactured by Cincinnati Milacron, Inc., the assignee of the present invention. The machining center includes a computer numerical controller (CNC) 12 for managing machine operations in accordance with a CNC program, and has a rotatable spindle 14 for carrying metal cutting tools 16, probes, etc., and the spindle is supported in a housing 18, in turn, carried by a movable spindle carrier 20.

Figure 2:
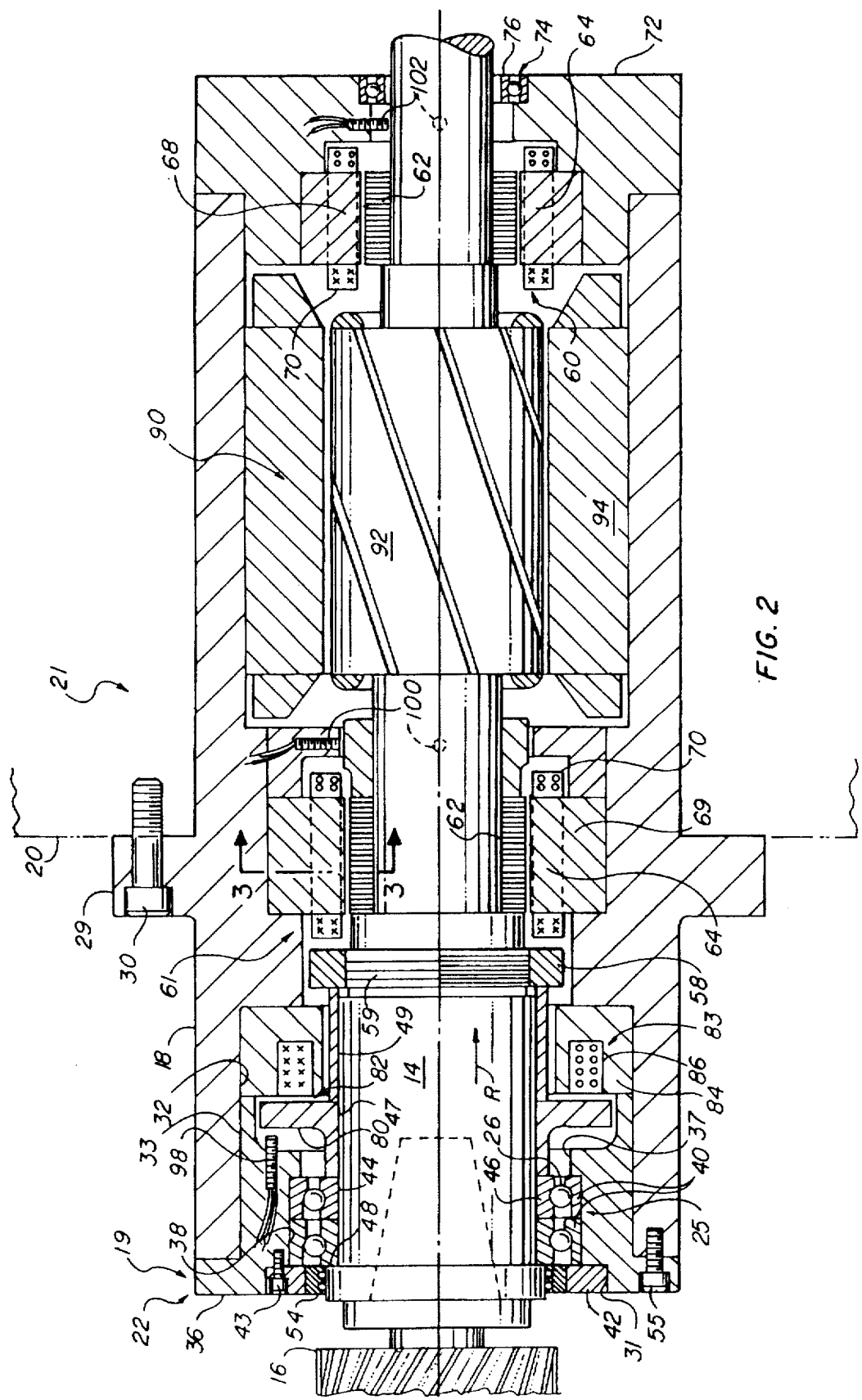
FIG. 2 is a side elevational section taken along the rotational axis of the rotatable spindle of FIG. 1.

FIG. 2 is a side elevational section taken through the spindle 14 and housing 18 of FIG. 1. The housing 18 is hollow so that the entire spindle length can pass therethrough. The spindle 14 is radially supported by a spindle support system 21 including a mechanical anti-friction radial and thrust bearing means 25 illustrated as a conventional pair of angular contact ball bearings 26 at the front of the housing, i.e., near a spindle nose 22. The pair of angular contact ball bearings 26 are axially tandem-mounted to take axial thrust in the same direction as well rotatably support the spindle 14 in the radial direction. Here it should be noted that types and numbers of mechanical anti-friction bearing means may be used at the discretion of the designer, and these would include tapered roller bearings. As depicted in FIG. 2, the radial and thrust bearing means 25 is arranged for supporting the major axial load in a rightward direction R. The metal cutting tool 16 such as a milling cutter, carried at the spindle nose 22, is applied to a variety of workpieces (not shown), so that major portions of the radial and axial components of the applied cutting load are borne by the radial and thrust bearing means.

The housing 18 is a generally tubular member having an aft flange 29 for bolting the housing 18 to the spindle carrier 20, and a plurality of cap screws 30 are provided for fastening the spindle carrier and the housing together. The housing 18 has a central bore 32 which supports a mounting tube 33 which extends part way down the central bore from a front end 19 of the housing 18. The mounting tube 33 is secured to the housing 18 by a forward mounting flange 36 of the mounting tube 33 bolted to the housing by screws 55. The mounting tube 33 has a clearance hole 37 machined through its center, and a front bearing counterbore 38 is provided in the tube 33 to receive back-to-back outer races 40 of the pair of the angular contact ball bearings 26. The front end of the clearance hole 37 has a front end counterbore 31 in front of the front bearing counterbore 38. A bearing locking cap 42 received in the front end counterbore 31 is fitted against the outer end of the bearing outer races 40 and, in turn, is secured to the mounting tube 33 by a plurality of cap screws 43. The rotatable machine tool spindle 14 is received through a race bore 44 of inner races 46 of the angular contact ball bearings 26. An annular seal cap 54 fits closely around and in sealing engagement with a shoulder 48 of the spindle 14.

The inner races 46 of the angular contact ball bearings 26 seat against the shoulder 48 of the spindle 14 and the inner races contact an annular element 47 that is to the right the inner races. An annular spacer 49 disposed on spindle 14 and between the annular element 47 together with the inner races 46 form an annular assembly disposed on the spindle. A locknut 58 threadably received on threads 59 of the spindle and in contact with the rear of the spacer 49 provides a means to lock this assembly of annular elements together.

The spindle support system further includes a magnetic radial rear bearing 60 and preferably a magnetic radial mid bearing 61 which together are utilized to radially support the spindle 14 and permit the spindle to slide freely. The magnetic radial mid and rear bearings, 61 and 60 respectively, are located at spindle positions remote from the radial and thrust bearing means 25 and cutting load. The magnetic radial rear bearing 60 is located near the end of the housing 18 and the magnetic radial mid bearing 61 is located approximately midway between the magnetic radial rear bearing 60 and the front end 19 of the housing. The magnetic radial rear and mid bearings 60 and 61, respectively are illustrated as, but not limited to, a single radial support electromagnetic bearing having a rotor 62 made of a magnetically attractive material affixed to the spindle 14 for rotation within a magnetic stator assembly 64 affixed to the housing 18.

Figure 3:
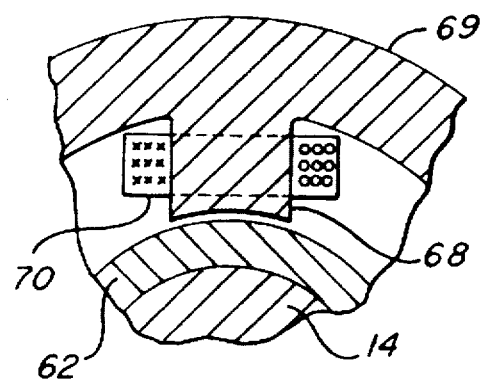
FIG. 3 is a front elevational section through a radial magnetic bearing, taken along the line 3—3 of FIG. 2.

The magnetic stator assembly 64, further illustrated from the front in FIG. 3, typically includes an annular stator 69 with cylindrical magnetic poles 68 depending inward therefrom and magnetized by stator coils 70. The magnetic radial rear bearing 60 is a non-contacting magnetic bearing that employs magnetic fields to support the spindle 14. Clearance is provided between the stator assembly 64 and the rotor 62 and the strength of the magnetic field produced by the stator assembly is controlled by a computerized controller such as the CNC 12 in FIG. 1.

Still referring to FIG. 2, a rear housing cap 72 is provided with a catch bearing 74, which is simply a conventional radial ball bearing having clearance between the spindle 14 and the catch bearing's inner race 76, so that, in the event of loss of the magnetic field of the magnetic radial rear bearing 60 or, in the event of reaction loads becoming such that deflection might overcome magnetic bearing clearances, the catch bearing will then provide auxiliary rotatable radial support for the spindle at the rear end of the housing 18.

A preferably electromagnetic thrust bearing 82 has a rotatable annular spindle flange 80 attached to the annular element 47 mounted on the spindle 14 and is located between the front radial and thrust bearing means 25 and the magnetic radial mid bearing 61. The electromagnetic thrust bearing 82 includes an electromagnet 83 having an annular electromagnet pole 84 disposed proximate to and facing the spindle flange 80 and which is affixed to the housing 18. The annular electromagnet pole 84 has a multi-turn electrical coil 86 wrapped around the electromagnet pole which when energized causes the electromagnet 83 to exert a force on the spindle flange 80. By varying the electromagnetic field of the electromagnet 83 in a controlled manner, in response to a control signal, predetermined axial strain on the spindle and consequent axial pre-load of the front radial and thrust bearing means 25 may be provided. It is important to note that the electromagnetic thrust bearing 82 and its electromagnet 83 provides a magnetic force means that exerts a thrust on the spindle flange 80 between the stationary housing 18 and the rotating spindle 14 and other magnetic means are contemplated by the present invention.

The electromagnetic thrust bearing 82 is constructed such that the electrical coil 86 generates an electromagnetic field, which exerts an attractive force on the spindle flange 80. This pulls the spindle and the inner races 46 of the angular contact ball bearings 26 backwards thereby pre-loading the angular contact ball bearings in a controlled manner in response to a control signal or signals. Such control signals may be generated using various means and devices, of which a few are discussed below, and transmitted to the computerized controller such as the CNC 12 in FIG. 1. A preferably direct drive electrically powered motor means 90 is provided along the spindle 14 between the front magnetic radial mid bearing 61 and the back magnetic radial rear bearing 60. The motor means 90 has a motor rotor 92 attached to the spindle 14 and a concentric motor stator 94 is attached to the housing 18, in a manner well-known in the spindle drive art.

The housing 18 is fitted with an axial position sensor 98 proximal the spindle flange 80; the axial position sensor 98 serves as a means to generate a control signal for controlling the electromagnetic thrust bearing 82. The axial position sensor 98 is operably connected to a controller (such as CNC 12 in FIG. 1) to provide feedback information to the controller for influencing the coil forces generated by the electrical coil 86 of the electromagnetic thrust bearing 82. The housing 18 is also provided with two pairs of 90° spaced-apart radial position sensors, mounted in quadrature. A pair of 90° spaced-apart forward radial position sensors 100 are located at a position proximal to the generally centrally located magnetic radial mid bearing 61 and another pair of 90° spaced-apart rear radial position sensors 102 are located at a position proximal to the rearwardly located magnetic radial rear bearing 60. These radial position sensors serve as means to generate the control signals and are operably connected to the controller (such as CNC 12 in FIG. 1) to provide feedback information to the controller for influencing the coil forces generated by the stator coils 70 of the magnetic radial mid and rear bearing, 61 and 60 respectively.

In a preferred embodiment the spindle support system 21 is provided with a dynamic spindle dampening means incorporating one or both of the magnetic radial mid and rear bearings, 61 and 60 respectively, operably controlled by a computerized controller such as the CNC 12 in FIG. 1. Besides providing primary support, the magnetic radial mid and rear bearings may be selectively energized to exert forces on the spindle 14 to influence machine vibrations detected by the radial position sensors 100 and 102.

Figure 5:
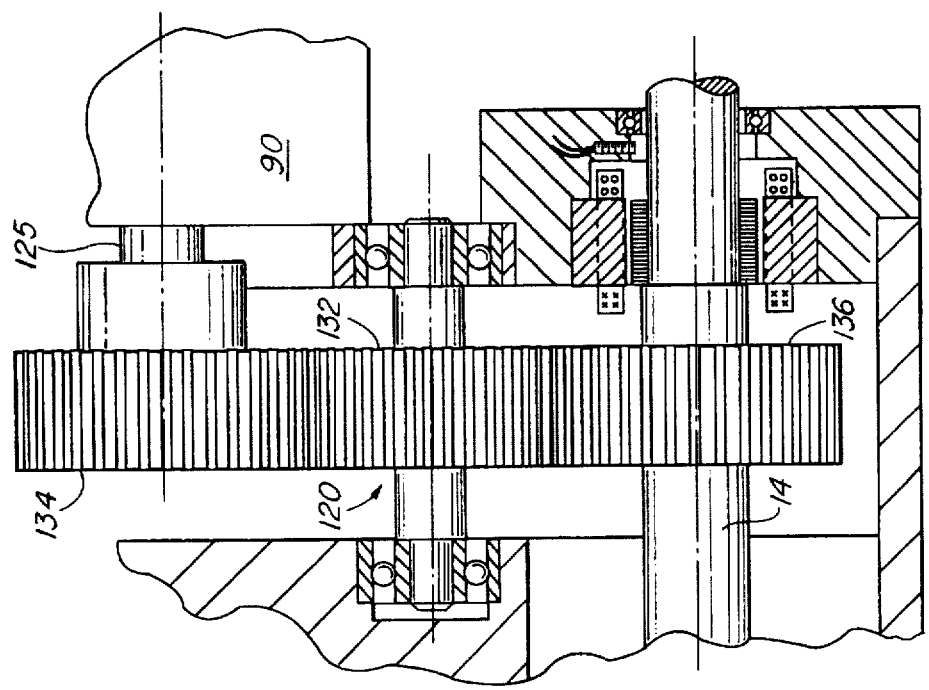
FIGS. 4 and 5 are partial side elevational sections illustrating alternative motor means for driving the spindle of FIG. 1.
Figure 4:
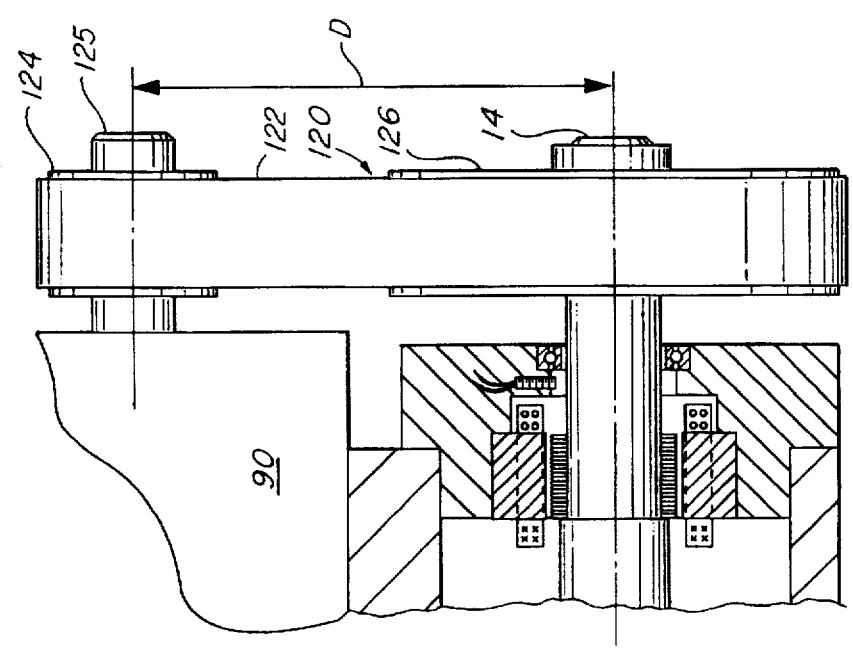

Among the various embodiments contemplated for the present invention are alternative motor means 90 such as those illustrated in FIGS. 4 and 5 which have the motor means 90 being disposed radially a distance D from the spindle 14 and a transmission means 120 operably connecting them. Illustrated in FIG. 4 is a belt-type transmission means 120 having a belt 122 drivenly connected to a first pulley 124 fixedly mounted to an output shaft 125 of motor means 90. A second pulley 126 fixedly mounted to an end of the spindle 14 and drivenly engaged by the belt 122 allows the belt 122 to transmit power from the motor means 90 to the spindle. Illustrated in FIG. 5 is a geared transmission means 120 incorporating a gear train having a spur gear 132 rotatably disposed in driving relationship between a first gear 134 fixedly mounted to an output shaft 125 of motor means 90 and a second gear 136 fixedly mounted to the spindle 14 in order to transmit power from the motor means to the spindle.

Though the thrust bearing 82 is preferably of the electromagnetic type, various alternative embodiments are contemplated for the present invention. Among these types are conventional thrust bearing means incorporating fluid cylinders, springs, and piezo electric elements. Also contemplated are conventional magnetic means connected to mechanical or fluid actuators.

While the invention has been shown in connection with a preferred embodiment, it is not the intention that the invention be so limited. Rather, the invention extends to all such designs and modifications as come within the scope of the appended claims.

What is claimed is:

1. A spindle support system for a spindle assembly, for use in a machine for generating radial cutting loads between a cutting tool and a workpiece, said spindle assembly having a housing, a spindle having a spindle nose proximal said cutting loads, and motor means for effecting relative rotation between said housing and said spindle, about a spindle axis, said spindle support system comprising:

a first bearing means for supporting said spindle and housing in a predetermined relationship during said relative rotation, said first bearing means comprising a mechanical anti-friction radial and thrust bearing means including anti-friction bearing elements, including pre-loadable rolling elements, said first bearing means being located along said spindle axis proximal said spindle nose such that the major portions of said radial cutting loads are borne by said first bearing means;

a second bearing means for radially supporting said spindle and housing in said predetermined relationship during said relative rotation, said second bearing means comprising a first assembly of magnetic bearing elements remotely spaced from said spindle nose along said spindle axis; and an axial pre-loading means for varying the pre-load of said pre-loadable rolling elements.

2. The spindle support system of claim 1, wherein said axial pre-loading means comprises a second assembly of magnetic elements.

3. The spindle support system of claim 1, wherein said first assembly of magnetic bearing elements comprise electromagnetic elements.

4. The spindle support system of claim 1, wherein said axial pre-loading means comprises an electromagnetic thrust bearing means.

5. The spindle support system of claim 2, wherein said second assembly of magnetic elements comprise electromagnetic elements.

6. The spindle support system of claim 4 further comprising a control means for varying an electromagnetic field of said electromagnetic thrust bearing means.

7. The spindle support system of claim 6 further comprising at least a first control signal means responsively connected to said control means.

8. The spindle support system of claim 7, wherein said control means is operable to control said electromagnetic thrust bearing means for axially pre-loading said radial and thrust bearing means in response to a first control signal from said first control signal means.

9. The spindle support system of claim 8 further comprising at least a second control signal means responsively connected to said control means and operable to generate and send a second control signal to said control means wherein said first control signal means includes at least one radial position sensor to measure the radial position of said spindle and said second control signal means includes at least one axial position sensor to measure the axial position of said spindle.

10. The spindle support system of claim 9 wherein said first control signal means includes a first pair of 90° spaced-apart forward radial position sensors that are located at an axial position proximal to said electromagnetic thrust bearing means and a second pair of 90° spaced-apart rear radial position sensors that are axially located at a position proximal to said second bearing means.

11. The spindle support system of claim 10 wherein said control means includes a computer numerical controller of a metal cutting machine and said spindle is operable to carry metal cutting tools.

12. The spindle support system of claim 11 further comprising a third bearing means for further radially supporting said spindle and housing in said predetermined relationship during said relative rotation, said third bearing means comprising a second assembly of electromagnetic bearing elements and located at an axial position between said electromagnetic thrust bearing means and said second bearing means.

13. The spindle support system of claim 12 wherein at least one said second and third bearing means is controllably operable to be selectively energized to exert radial forces on said spindle to influence machine vibrations detected by said radial position sensors.

14. A machining center for generating radial cutting loads between a cutting tool and a workpiece, comprising:
 a computer numerical controller for managing machine operations in accordance with a CNC program;
 a spindle support system including a housing, a spindle having a spindle nose proximal said cutting loads, and motor means for effecting relative rotation between said housing and said spindle, about a spindle axis;
 said spindle support system comprising;

a first bearing means for supporting said spindle and housing in a predetermined relationship during said relative rotation, said first bearing means comprising a mechanical anti-friction radial and thrust bearing means including anti-friction bearing elements, including pre-loadable rolling elements, said first bearing means being located along said spindle axis proximal said spindle nose such that the major portions of said radial cutting loads are borne by said first bearing means;
 a second bearing means for radially supporting said spindle and housing in said predetermined relationship during said relative rotation, said second bearing means comprising at least one electromagnetic magnetic bearing remotely spaced from said spindle nose along said spindle axis; and
 an axial pre-loading means for varying the pre-load of said pre-loadable rolling elements.

15. The machining center of claim 14, wherein said axial pre-loading means comprises an electromagnetic thrust bearing means.

16. The machining center of claim 15 further comprising at least a first control signal means responsively connected to a control means for varying an electromagnetic field of said electromagnetic thrust bearing means.

17. The machining center of claim 16 further comprising at least a second control signal means responsively connected to said control means and operable to generate and send a second control signal to said control means wherein said first control signal means includes at least one radial position sensor to measure the radial position of said spindle and said second control signal means includes at least one axial position sensor to measure the axial position of said spindle.

18. The machining center of claim 17, wherein said control means is operable to control said electromagnetic thrust bearing means for axially pre-loading said radial and thrust bearing means.

19. The machining center of claim 18 wherein said computer numerical controller includes said control means.

20. The machining center of claim 19 further comprising a third bearing means for further radially supporting said spindle and housing in said predetermined relationship during said relative rotation, said third bearing means comprising a second assembly of electromagnetic bearing elements and located at an axial position between said electromagnetic thrust bearing means and said second bearing means.

21. The spindle support system of claim 20 wherein at least one said second and third bearing means is controllably operable to be selectively energized to exert radial forces on said spindle to influence machine vibrations detected by said radial position sensors.

* * * * *